United States Patent [19]

Ishii et al.

[11] Patent Number: 5,230,825
[45] Date of Patent: Jul. 27, 1993

[54] CHIRAL SMECTIC C LIQUID CRYSTALLINE POLYESTER

[75] Inventors: Takafumi Ishii; Takehiro Toyooka; Hiroyuki Itoh, all of Yokohama, Japan

[73] Assignee: Nippon Oil Company, Limited, Tokyo, Japan

[21] Appl. No.: 413,768

[22] Filed: Sep. 26, 1989

[30] Foreign Application Priority Data

Sep. 26, 1988 [JP] Japan .................. 63-238888
Sep. 26, 1988 [JP] Japan .................. 63-238889
Oct. 13, 1988 [JP] Japan .................. 63-255829

[51] Int. Cl.$^5$ .................. C09K 19/52; C09K 19/00; C09K 19/12; C08G 63/68
[52] U.S. Cl. .................. 252/299.01; 252/299.66; 528/299; 528/308; 428/1
[58] Field of Search .................. 528/308, 299; 428/1; 252/299.01, 299.66

[56] References Cited

U.S. PATENT DOCUMENTS

| 3,864,315 | 2/1975 | Ohno et al. .................. 528/308 X |
| 4,072,662 | 2/1978 | van der Linde et al. ........ 528/308 X |
| 4,904,747 | 2/1990 | Morris et al. ................. 528/308 X |
| 4,916,205 | 4/1990 | Morris et al. ................. 528/308 X |
| 5,081,221 | 1/1992 | Wantanabe .................... 252/299.01 |

FOREIGN PATENT DOCUMENTS

| 308171 | 9/1988 | European Pat. Off. ....... 252/299.01 |
| 292244 | 11/1988 | European Pat. Off. ....... 252/587 |
| 306339 | 3/1989 | European Pat. Off. ....... 252/299.01 |
| 338845 | 10/1989 | European Pat. Off. ....... 252/587 |

OTHER PUBLICATIONS

J-C Dubois et al. Mol. Crys. Liq. Crys., vol. 137, 349-364, Dec., 1986.
V. P. Shibaev et al., Polymer Bulletin, vol. 12, 229-301 (1984).
Ober, C. K. et al in Advances in Polymer Science 59 M. Gordon, ed. Springer-Verlag, Berlin, 1984 p. 103.
Chiellini, E. et al Polymer Bulletin, 9, 336, 1983.
Chiellini, E. et al in Recent Advances in Mechanistic and Synthetic Aspects of Polymerization, 425, D. Reidel, 1987.

Primary Examiner—Robert L. Stoll
Assistant Examiner—Philip Tucker
Attorney, Agent, or Firm—Scully, Scott, Murphy & Presser

[57] ABSTRACT

A chiral smectic C liquid crystalline polyester consisting essentially of structural units (A), (B) and (C) of the following formulae:

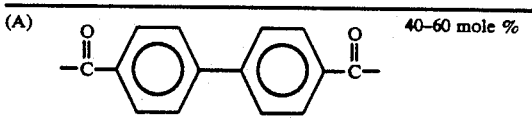

(A) 40-60 mole %

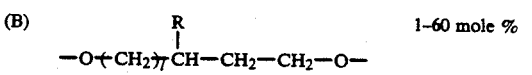

(B) 1-60 mole % which is optically active and wherein R represents an alkyl group having 1 to 3 carbon atoms, or chlorine, and l is an integer of 1 to 4, and

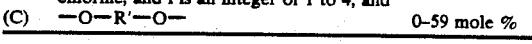

(C) —O—R'—O—  0-59 mole % wherein R' represents a straight chain or branched divalent hydrocarbon group having 2 to 18 carbon atoms.

5 Claims, 5 Drawing Sheets

POLYMER NO. 20

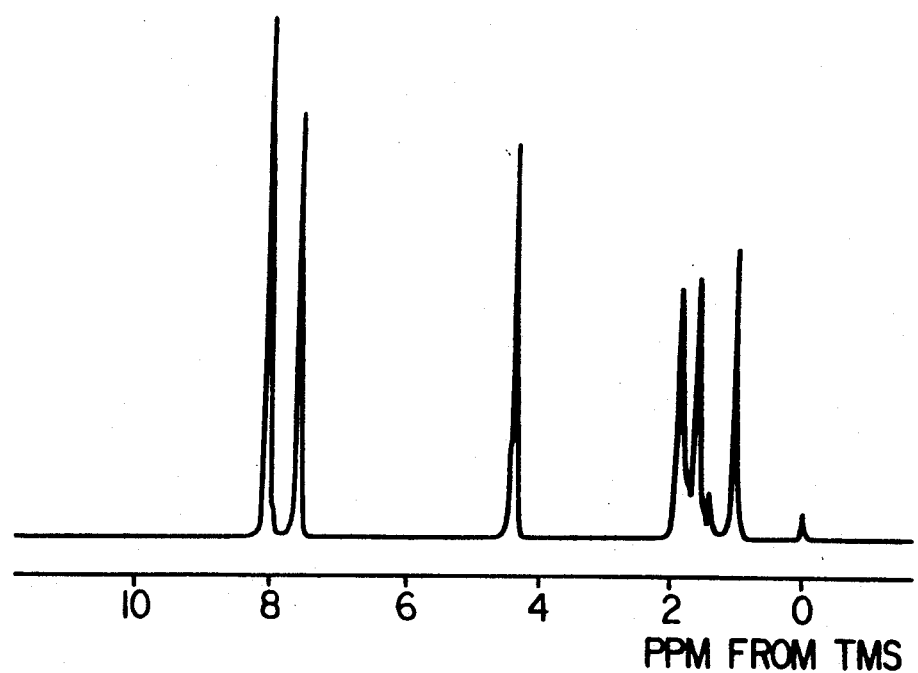
FIG.IA
POLYMER NO. 2
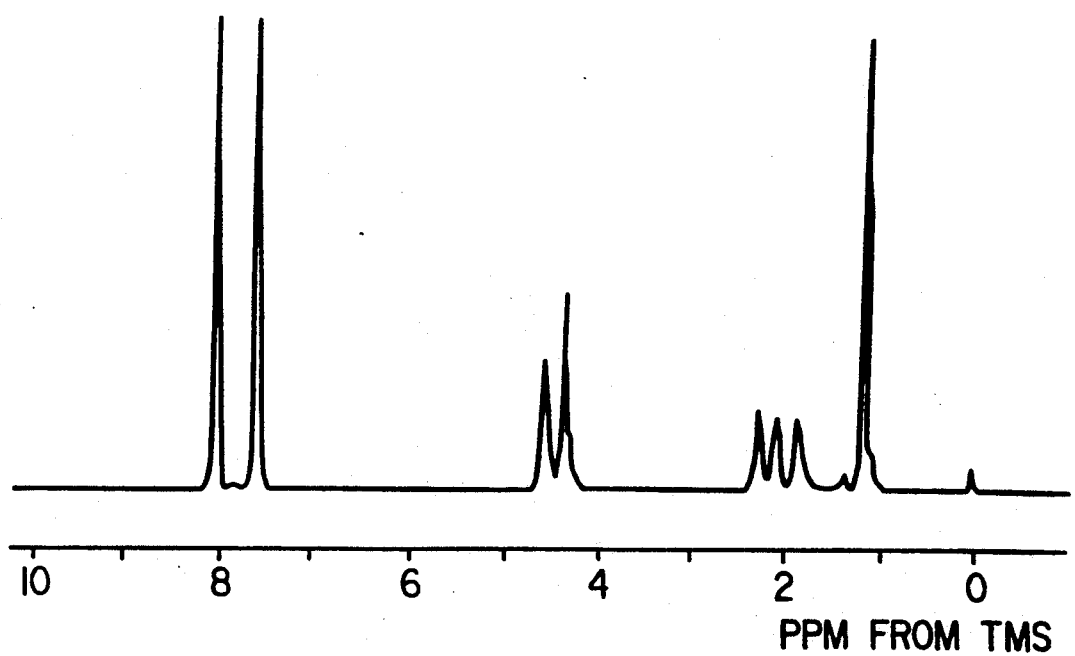
FIG.IB
POLYMER NO. 9

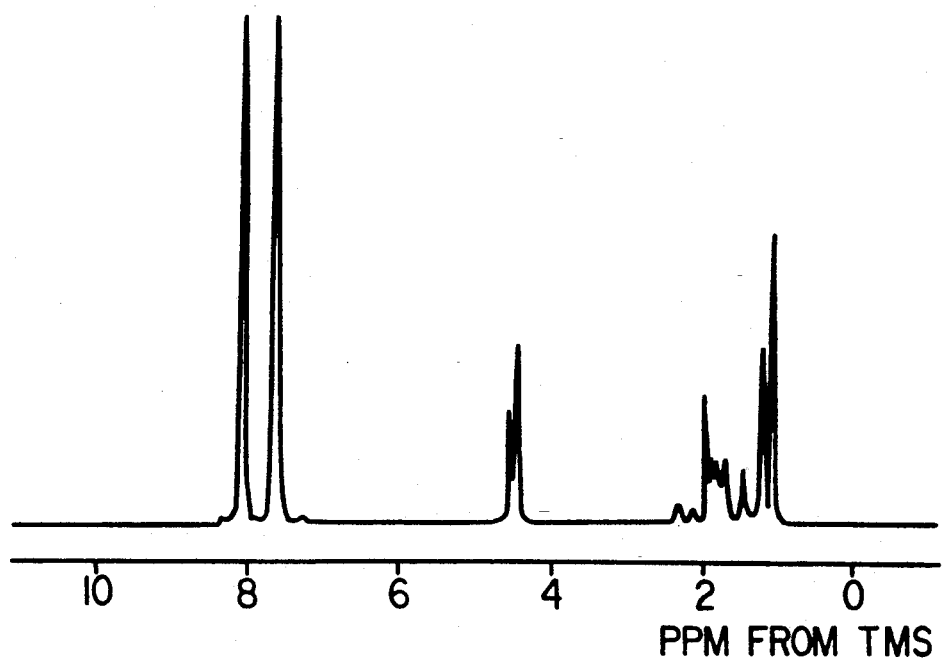
FIG.IC
POLYMER NO. 15
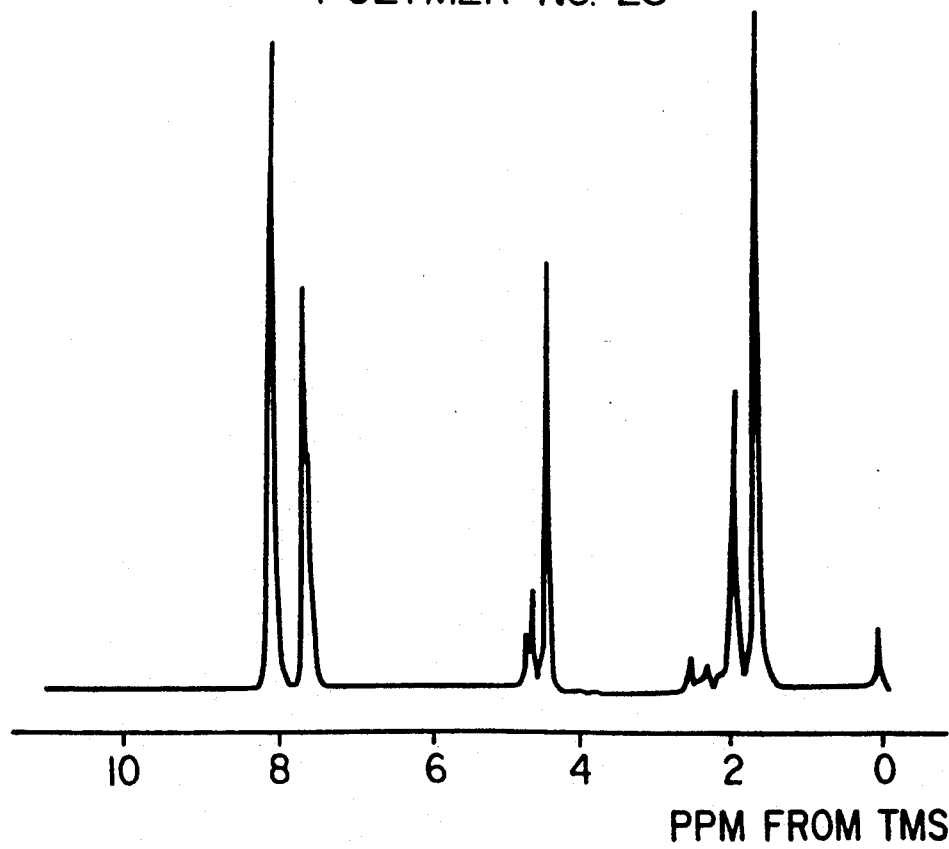
FIG.ID
POLYMER NO. 23

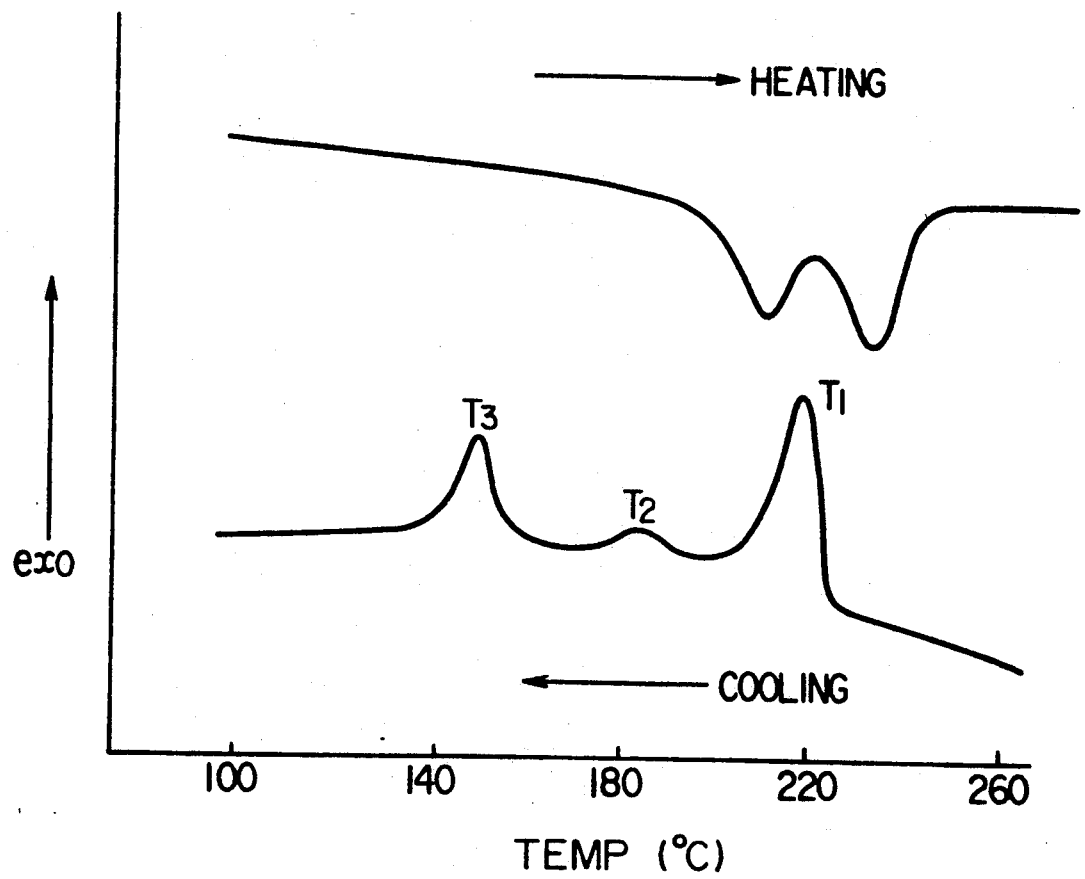

POLYMER NO. 20

CHIRAL SMECTIC C LIQUID CRYSTALLINE POLYESTER

BACKGROUND OF THE INVENTION

The present invention relates to a novel chiral smectic C liquid crystalline polyester having large spontaneous polarization, capable of forming a stable smectic C liquid crystal in a wide temperature range and being subjected to melt-molding, and suitable for use in the field of optoelectronics and in the optical field.

Since liquid crystals have a specific order of the molecular orientation peculiar to them, they can be used in various fields by utilizing or controlling their molecular orientation, thus forming a great industrial field. As to lowmolecular liquid crystals, as well known, those of nematic type are in wide use as display elements for watches, desk-top electronic calculators or televisions and they occupy an immovable position in the display field. Recently, moreover, chiral smectic C liquid crystals having characteristic features such as high-speed operation and memory function have been noted as liquid crystals for the display elements of the next generation which will take the place of the nematic ones referred to above. And now there is keen competition for the development thereof.

On the other hand, as to high-molecular liquid crystals, it is well known that they exhibit electrooptical effects or thermooptical effects similar to those of the low-molecular liquid crystals according to the types of them, i.e., nematic, smectic and cholesteric types, not to mention their excellent mechanical characters. The response of the high-molecular liquid crystals to an external force such as an electric field and heat is slower than that of the low-molecular ones because of their high viscosity, but basically they have the same properties as the properties of the low-molecular liquid crystals. Further, the orientation structure peculiar to each type of the high-molecular liquid crystals can be fixed, and the high-molecular liquid crystals permit easy formation of a flexible film having a large area. These are great characteristic features not found in the low-molecular liquid crystals.

Therefore, if a high polymer which exhibits chiral smectic C liquid crystallinity can be prepared, it will have the same function as that of the low-molecular chiral smectic C liquid crystals, which liquid crystallinity can be fixed, and it will afford a material having a large area and easy to handle, so it can be applied to various uses in the fields of display materials, recording materials and optical materials. However, there is scarcely known any polymer which exhibits clear chiral smectic C liquid crystallinity and which permits fixing thereof. For example, J. C. Dubois et al. reported polyacrylic ester derivatives having a structure of the following formula in which the side chain has a mesogen containing a chiral unit [Mol. Cryst. Liq. Cryst., 137, 349 (1986)]:

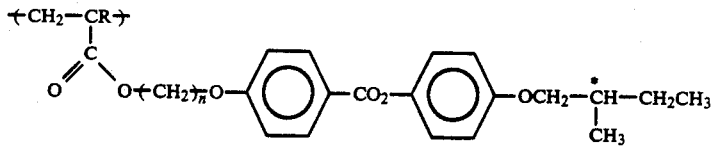

(n = 2, 6, 11; R = H, $CH_3$, Cl)

According to X-ray diffractometry of polymers of the above formula wherein R is H and n is 2, R is $CH_3$ and n is 11, or R is Cl and n is 11, Dubois et al. found that the polymers had a smectic layer structure and that the major axis of the mesogen of the side chain was inclined relative to the normal. From these facts they suggested the possibility of these polymers forming a phase looking like chiral smectic C in a certain temperature range. However, no report has been made by them on the results of optical observation or pitch length, and the formation of the chiral smectic C phase has not been proved clearly by them, with no report on the fixation, either. Further, the preparation of the monomer having such a side chain requires a multiple step operation and is extremely troublesome.

In addition, V. P. Shibaev. et al. reported polyacrylic ester derivatives similar to those described above [Polymer Bulletin 12, 299 (1984)]:

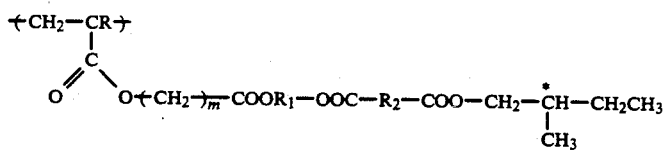

wherein m represents a number of 6 to 12 and no definition is given to R, $R_1$ and $R_2$.

According to X-ray diffractometry, Shibaev et al. found that these derivatives had a smectic layer structure, that the major axis of the mesogen of the side chain was inclined relative to the normal and that spontaneous polarization was observed. From these facts they concluded that the polymers form a chiral smectic C liquid crystal phase However, the structure of the Shivaev et al.'s polymers has not been made clear; besides, like the polymers of Dubois et al., the preparation of the Shivaev et al.'s polymers is extremely troublesome and an industrial preparation thereof encounters difficulties. And no report has been made by them about fixation. Further, these polymers of the polyacrylic acid derivative type are produced by introducing the low-molecular chiral smectic C liquid crystals as they are into the side chain thereof. In this sense it can be said that they lie on the extension of the low-molecular liquid crystals. On the other hand, high-molecular liquid crystals of the main chain type containing a chiral component in the main chain and being clear chiral smectic C liquid crystals are not known at all. Although the production of polyesters and polyamides containing a chiral component in the main chain thereof has been reported, the products are mostly cholesteric liquid crystals. Further, although there are some examples of nematic and smectic liquid crystals produced, no reports have been made about products having a distinct chiral smectic C phase.

SUMMARY OF THE INVENTION

The present invention has been accomplished in view of the above-mentioned drawbacks of the polyacrylic ester derivatives described above, and it is the object thereof to provide polymers capable of forming a distinct chiral smectic C phase, permitting easy fixation, and capable of being melt-molded and produced easily industrially.

Having made intensive investigations, the present inventors found that polyesters containing a specific mesogen and a specific chiral component form distinct chiral smectic C liquid crystals and solve the foregoing problems.

The present invention resides in a novel chiral smectic C liquid crystalline polyester consisting essentially of the following structural units (A), (B) and (C):

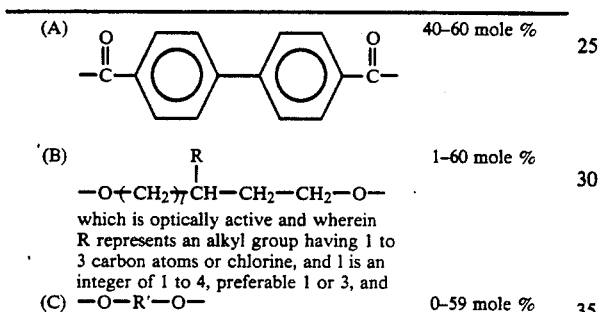

wherein R' represents a straight chain or branched, divalent hydrocarbon group.

DETAILED DESCRIPTION OF THE INVENTION

The components which constitute the polyester of the present invention will now be described. The unit (A) is an essential component which acts as a mesogen for exhibiting the liquid crystalline property It is derived from a biphenyl4,4'-dicarboxylic acid or a derivative thereof (such as a dialkyl ester, e.g. diethyl ester, or an acid chloride). The unit (A) is present in the polymer in a proportion of 40-60 mole%, preferably 45-55 mole%, particularly 50 mole% substantially. In the polyester consisting of only the units (A), (B) and (C), the unit (A) is 50 mole% and the total of the units (B) and (C) is 50 mole%. The unit (B) is an essential component which acts as an optically active component for the polyester of the present invention to form the chiral smectic C liquid crystal phase. It is derived from optically active 2-methyl-1,4-butanediol, 2-ethyl-1,4-butanediol, 2-propyl1,4-butanediol, 2-chloro-1,4-butanediol, 3-ethyl-1,6-hexanediol, 3-propyl-1,6-hexanediol, or a derivative thereof (e.g. a diacetoxy compound).

The butane- or hexanediol used may be an R-isomer, an S-isomer, or a mixture of both. When the mixture is used, the difference in amount between the two must be at least 1%, preferably 10% or more, more preferably 20% or more. A difference in content between the R- and S-isomers smaller than 1% is not desirable because the temperature range in which the chiral smectic C phase is formed becomes narrower. The proportion of the unit (B) is in the range of preferably 1 to 60 mole%, particularly preferably 10 to 50 mole%. A proportion of the unit (B) less than 1 mole% is not desirable because the temperature range in which the chiral smectic C phase is formed becomes narrower The unit (C) is a component for controlling the transition temperature, temperature range and viscosity in the formation of the chiral smectic C phase from the polyester of the present invention. The kind and content of the unit (C) can be selected according to the physical properties of the polymer to be obtained The proportion of the unit (C) can be selected suitably in the range of 0 to 59 mole%, depending on the purpose, but the range of 5 to 50 mole% is preferred from the viewpoint of controlling the physical properties. In the foregoing formula of the unit (C), R' represents a straight chain or branched, divalent hydrocarbon group, preferably a saturated chain hydrocarbon group, having 2 to 18, preferably 3 to 12, carbon atoms. As typical such hydrocarbon groups are mentioned

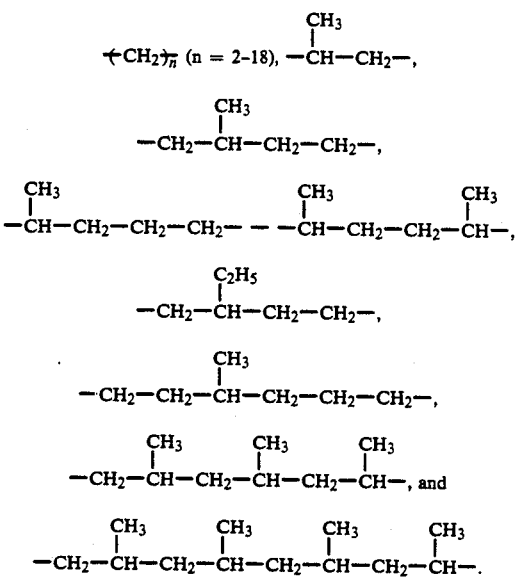

Among these, particularly preferred are

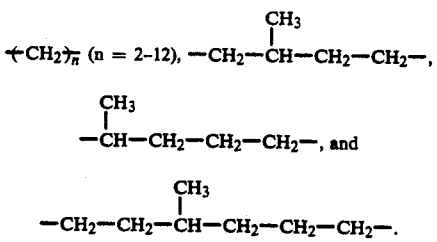

When the number of carbon atom is 1 or larger than 18, the liquid crystals are not formed in some cases. The unit (C) is derived from a corresponding α, ω-diol or a derivative thereof (e.g., a diacetoxy derivative).

How to prepare the chiral smectic C liquid crystalline polyester of the present invention is not specially limited. The polyester can be prepared by a known melt polymerization process or a known solution polymerization process using a biphenyl dicarboxylic acid dichloride, as in the conventional polyester preparation.

An example of a melt polymerization process involves polymerizing predetermined amounts of dialkyl biphenyl-4,4'-dicarboxylate, optically active butane- or hexanediol and an α, ω-alkanediol at a high temperature in high vacuum. The molecular weight can be easily adjusted by conventional means, for example, by controlling the polymerization time. To accelerate the polymerization reaction there may be used known polyester-forming catalysts such as alkali metal salts and metal salts, e.g., Fe, Mn, Cd, Mg, Ba, Ti, Zn, Pb, Co, Sb and Sn salts, each alone or in combination of two or more thereof. Further, a phosphorus compound may be used as a decomposition inhibitor.

The adoption of a solution polymerization process permits the polymerization to be performed under milder conditions. For example, the polyester can be obtained easily by dissolving predetermined amounts of biphenyl-4,4'-dicarboxylic acid dichloride, optically active butane- or hexanediol and α, ω-alkanediol in a solvent and heating them in the presence of an acid acceptor such as pyridine. The molecular weight of the polyester of the present invention is in the range of preferably 0.05 to 5.0, more preferably 0.1 to 2.0, most preferably 0.2 to 1.0, in terms of an intrinsic viscosity $[\eta]$ as measured in a mixed phenol/tetrachloroethane (volume ratio: 60/40) solvent at 25° C. If $[\eta]$ is lower than 0.05, there will arise such a problem as lowering of the film strength, and a [n] value larger than 5.0 will result in a too high viscosity, which inhibits the formation of the liquid crystals. Thus, both such values outside the aforesaid range are not desirable.

The chiral smectic C liquid crystalline polyester of the present invention prepared in the above manner has a large spontaneous polarization, exhibits a stable chiral smectic C liquid crystal phase in a wide temperature range and can be melt-molded. By making the most of these features the polyester of the invention can be applied to various fields, including the fields of display materials, recording materials, optical materials using characteristics to light, ornaments and materials for fashion.

EXAMPLES

The following Examples will further illustrate the present invention, but it is to be understood that the invention is not limited thereto. The analytical methods used in the Examples are as follows.

(1) Determination of Composition

Each polymer obtained was dissolved in deuterated trifluoroacetic acid and the composition thereof was determined by $^1$H-NMR (JNM-GX400, a product of JEOL, Ltd.) of 400 MHz or $^1$H-NMR (MSL-300, a product of Bruker) of 300 NHz.

(2) Determination of Intrinsic Viscosity

The determination of intrinsic viscosity was performed using an Ubbelohde's viscometer in a mixed phenol/tetrachloroethane (volume ratio: 60/40) solvent at 25° C.

(3) Determination of DSC

DSC was determined using a Dupont 990 Thermal Analizer.

(4) Observation with Optical Microscope

Texture was observed using a polarizing microscope BH2 (a product of Olympus Optical Co., Ltd.).

EXAMPLE 1

Preparation of Chiral Smectic C Liquid Crystalline Polyesters (1) 50.5 mmol of diethyl biphenyl-4,4'-dicarboxylate, 38.2 mmol of (S)-2-methyl-1,4-butanediol (enantiotropic excess (e.e.) =92%), 34.5 mmol of an optically inert-2-methyl1,4-butanediol and one drop of tetrabutoxytitanium were charged into a reactor provided with a stirrer. After purging with nitrogen gas, reaction was conducted at 175° C. in a nitrogen gas stream for 60 minutes. The reaction was then continued at 175° C. for 30 minutes under reduced pressure to give a polymer (Polymer No.1 in Table 1).

(2) A solution of 51.4 mmol of biphenyl-4,4'-dicarboxylicacid dichloride, 36.2 mmol of (S)-2-methyl-1,4-butanediol (e.e.=92%), 18.6 mmol of 1-methyl-1,4-butanediol and 25 ml of pyridine in 250 ml of o-dichlorobenzene was stirred at 70° C. in a nitrogen gas stream for 2 hours to allow polymerization to take place. The reaction solution was then filtered and thereafter poured into methanol to allow the resulting polymer to precipitate, followed by filtration and subsequent drying under reduced pressure to give a polymer (Polymer No. 3 in Table 1).

(3) Various polyesters different in structure, composition ratio and molecular weight shown in Table 1 were prepared using diethyl biphenyl-4,4'-dicarboxylate or biphenyl4,4'-dicarboxylic acid dichloride, (S)-2-alkyl-1,4-butanediols of various e.e. values and various α, ω-alkanediols, according to a melt polycondensation process (the process described in the above )1), hereinafter referred to simply as the "melt process") or a process using an acid chloride (the process described in the above (2), hereinafter referred to a the "acid chloride process"). The compositions and $[\eta]$ values of the polymers obtained are as set forth in Table 1. As an example, regarding Polymer No. 2, the $^1$H-NMR spectra is shown in FIG. 1.

EXAMPLE 2

Identification of Chiral Smectic C structure (1) Determination of DSC and observation with polarizing microscope:

DSC thermograms of Polymer Nos. 2 and 3 are shown in FIG. 2. As a result of observation with a polarizing microscope, a broken fan-shape texture was observed in the temperature range between $T_2$ and $T_3$ at the time of temperature drop in Polymer No. 2 and in the temperature range between $T_5$ and $T_6$ in Polymer No. 3. Thus, these polymers proved to have the smectic C phase. Also with respect to the other polymers in Table 1, a broken fan-shape texture was observed.

(2) Polarization reversal by the application of voltage:

Each of the polymers in Table 1 was sealed into a cell including two glass (ITO glass) plates whose surfaces had been treated for electroconduction and a 12.5 μm thick polyimide film as a spacer interposed between them to fix the thickness. The cell was then placed in a Mettler's hot stage and positive and negative voltages were applied under observation with a polarizing microscope while the temperature was held at a level at which the chiral smectic C phase was exhibited, to check the reversal of polarization. When a square wave AC voltage of 300V , 10 Hz was applied, the domain in the microscope field changed form dark to bright field, following the change in voltage. This change was observed with respect to all the polymers. It turned out that the reversal of polarization occurred in all the polymers. That is, all of the polymers shown in Table 1 proved to be chiral smectic C liquid crystals, exhibiting ferroelectricity.

TABLE 1

| Polymer No. | Unit A | Unit B (e.e.%) | Unit C | A:B:C (molar ratio) | [η] (dl/g) |
|---|---|---|---|---|---|
| 1 | $-\overset{O}{\underset{\|\|}{C}}-\bigcirc-\bigcirc-\overset{O}{\underset{\|\|}{C}}-$ | $-O-CH_2\overset{CH_3}{\underset{*}{C}H}CH_2CH_2O-$ (92) | $-O-CH_2\overset{CH_3}{C}HCH_2CH_2O-$ | 50:26:24 | 0.28 |
| 2 | " | " | " | 50:33:17 | 0.23 |
| 3 | " | " | $-O\overset{CH_3}{C}HCH_2CH_2CH_2O-$ | 50:24:25 | 0.18 |
| 4 | " | " | $-O\overset{CH_3}{C}HCH_2CH_2\overset{CH_3}{C}HO-$ | 52:26:22 | 0.20 |
| 5 | " | $-O-CH_2\overset{CH_3}{\underset{*}{C}H}CH_2CH_2O-$ (28) | " | 50:13:38 | 0.31 |
| 6 | " | $-O-CH_2\overset{CH_3}{\underset{*}{C}H}CH_2CH_2O-$ (92) | $-OCH_2CH_2\overset{CH_3}{C}HCH_2CH_2CH_2O-$ | 49:19:32 | 0.64 |
| 7 | " | " | " | 50:39:11 | 0.58 |
| 8 | " | $-O-CH_2\overset{C_2H_5}{\underset{*}{C}H}CH_2CH_2O-$ (45) | $-O(CH_2)_4\overset{CH_3}{C}H(CH_2)_5O-$ | 51:24:25 | 0.30 |

(Note 1)
Polymer Nos. 1, 2 and 6–8 were prepared by the melt process and Polymer Nos. 3–5 by the acid chloride process.
(Note 2)
The proportions of the units B and C in the composition ratios of Polymer Nos. 1 and 2 are not determined from NMR. Their values in the table have been estimated from the feed compositions.

TABLE 2

| Polymer No. | Phase transition temperature (°C.)[1] | Phase series (in temp. drop)[2] |
|---|---|---|
| 1 | 226, 192, 140 | Iso, Ch, Sc*, K |
| 2 | 218, 184, 147 | Iso, Ch, Sc*, K |
| 3 | 185, 160, 60 | Iso, Ch, Sc*, g |
| 4 | 145, 82, 70 | Iso, Ch, Sc*, g |
| 5 | 148, 78, 64 | Iso, Ch, Sc*, g |
| 6 | 192, 145, 72 | Iso, S_A, Sc*, K |
| 7 | 190, 143, 97 | Iso, S_A, Sc*, K |
| 8 | 113, 84, 47 | Iso, Ch, Sc*, g |

[1] DSC (20° C./min)
[2] Iso: isotropic phase,
Ch: cholesteric phase,
S_A: smectic A phase,
Sc*: chiral smectic C phase,
g: glass phase,
K: crystal phase (3) Forming transmission type color film:

0.2 g of Polymer No. 3 was placed between two Pyrex glass plates each 5 cm ×2 cm ×0.1 cm so that the polymer was located at the center of the plates. A 20 μm thick aluminum film for thickness adjustment was also placed between the plates. They were preheated on a bench press at 190° C. for 30 minutes and then pressed by slowly applying a pressure while keeping the temperature at that point. The product was taken out of the press, kept at 140° C. for 1 hour and then cooled to obtain a film sample. Light passing through this film looked clearly colored and the color changed depending on the angle of incidence. This indicates that this polymer film has a spiral periodic structure perpendicular to the glass surface and that the chiral smectic C liquid crystal phase is fixed. The same result was obtained also with respect to the other polymers in Table 1 except Polymer Nos. 5 and 8. In the case of Polymer Nos. 5 and 8, no color is seen because of a long spiral pitch and selective transmission of infrared light.

Identification of the liquid crystal phase was performed with respect to each of the polymers shown in Table 1 according to the above methods (1), (2) and (3) and the results of Table 2 were obtained. It turned out that all of the polymers had a stable chiral smectic C liquid crystal phase in a wide temperature range and that the chiral smectic C phase could be fixed easily.

EXAMPLE 3

Preparation of Chiral Smectic C Liquid Crystalline Polyesters (1) 52.0 mmol of diethyl biphenyl-4,4"-dicarboxylate, 43.2 mmol of (R)-3-methyl-1,6-hexanediol (enantiotropic excess (e.e.)=95%), 43.4 mmol of 1,6-hexanediol and one drop of tetrabutoxytitanium were charged into a reactor provided with a stirrer. After purging with nitrogen gas, reaction was conducted at 175° C. in a nitrogen gas stream for 60 minutes. The reaction was then continued at 175° C. for 30 minutes under reduced pressure to give a polymer (Polymer No. 10 in Table 3).

(2) A solution of 50.2 mmol of biphenyl-4,4'-dicarboxylic acid dichloride, 25.9 mmol of (R)-3-methyl-1,6-hexanediol (e.e.=64%), 25.5 mmol of 1-methyl-1,4-butanediol and 25 ml of pyridine in 250 ml of o-dichlorobenzene was stirred at 70 ° C. in a nitrogen gas stream for 2 hours to allow polymerization to take place. The reaction solution was then filtered and thereafter poured into methanol to allow the resulting polymer to precipitate, followed by filtration and subsequent drying under reduced pressure to give a polymer (Polymer No. 14 in Table 3).

(3) Various polyesters different in structure, composition ration and molecular weight shown in Table 3 were prepared using diethyl biphenyl-4,4'-dicarboxylate or biphenyl4,4'-carboxylic acid dichloride, (R)-3-alkyl-1,6hexanediol of various e.e. values and various α, ω-alkanediols, according to the melt process (the process described in (1)) or the acid chloride process (the process described in (2)). The compositions and [η] values of the polymers obtained are as set forth in Table 3. As an example, regarding Polymer Nos. 9 and 15, their $^1$H-NMR spectra are shown in FIG. 1.

Each of the polymers in Table 3 was sealed into a cell including two glass (ITO glass) plates whose surfaces had been treated for electroconduction and a 12.5 μm thick polyimide film as a spacer interposed between them to fix the thickness. The cell was then placed in a Mettler's hot stage and positive and negative voltages were applied under observation with a polarizing microscope while the temperature was held at a level at which the chiral smectic C phase was exhibited, to check the reversal of polarization. When a square wave AC voltage of 300V, 10 Hz was applied, the domain int eh microscope field changed from dark to bright field, following the change in voltage. This change was observed with respect to all the polymers. It turned out that the reversal of polarization occurred in all the polymers. That is, all of the polymers shown in Table 3 proved to be chiral smectic C liquid crystals, exhibiting ferroelectricity.

TABLE 3

| Polymer No. | Unit A | Unit B (e.e.%) | Unit C | A:B:C (molar ratio) | [η] (dl/g) |
|---|---|---|---|---|---|
| 9 | $-\overset{O}{\underset{\|\|}{C}}-\bigcirc-\bigcirc-\overset{O}{\underset{\|\|}{C}}-$ | $-OCH_2CH_2\overset{CH_3}{\underset{\|}{\overset{*}{C}H}}CH_2CH_2CH_2O-$ (95) | $-O-(CH_2)_7O-$ | 49:13:38 | 0.45 |
| 10 | " | " | $-O-(CH_2)_6O-$ | 49:27:24 | 0.28 |
| 11 | " | " | $-O-(CH_2)_8O-$ | 50:38:12 | 0.34 |
| 12 | " | " | $-O-(CH_2)_{10}O-$ | 47:23:30 | 0.22 |
| 13 | " | " | $-O-(CH_2)_{12}O-$ | 45:24:30 | 0.72 |
| 14 | " | $-OCH_2CH_2\overset{CH_3}{\underset{\|}{\overset{*}{C}H}}CH_2CH_2CH_2O-$ (64) | $-O-\overset{CH_3}{\underset{\|}{CH}}-CH_2CH_2CH_2O-$ | 52:35:13 | 0.33 |
| 15 | " | $-OCH_2CH_2\overset{CH_3}{\underset{\|}{\overset{*}{C}H}}CH_2CH_2CH_2O-$ (64) | $-O-CH_2-\overset{CH_3}{\underset{\|}{CH}}CH_2CH_2O-$ | 51:24:25 | 0.36 |
| 16 | " | $-OCH_2CH_2\overset{C_2H_5}{\underset{\|}{\overset{*}{C}H}}CH_2CH_2CH_2O-$ (85) | $-O-\overset{CH_3}{\underset{\|}{CH}}CH_2CH_2\overset{CH_3}{\underset{\|}{CH}}O-$ | 50:25:25 | 0.33 |
| 17 | " | $-OCH_2CH_2\overset{CH_3}{\underset{\|}{\overset{*}{C}H}}CH_2CH_2CH_2O-$ (95) | $-O-CH_2CH_2\overset{CH_3}{\underset{\|}{CH}}CH_2CH_2CH_2O-$ | 50:50 | 0.17 |
| 18 | " | $-OCH_2CH_2\overset{C_3H_7}{\underset{\|}{\overset{*}{C}H}}CH_2CH_2CH_2O-$ (27) | $-O-(CH_2)_6O-$ | 51:11:38 | 0.14 |

EXAMPLE 4

Identification of Chiral Smectic C Structure (1) Determination of DSC and observation with polarizing microscope;

DSC thermogram of Polymer No. 10 is shown in FIG. 2. As a result of observation with a polarizing microscope, a broken fan-shape texture was observed in the temperature range between $T_2$ and $T_3$ at the time of temperature drop in Polymer No. 10 and in the temperature range between $T_5$ and $T_6$ in polymer No. 12. Thus, these Polymers proved to have the smectic C phase. Also with respect to the other polymers in Table 3, a broken fan-shape texture was observed.

(2) Polarization reversal by the application of voltage:

(3) Forming transmission type color film:

0.2 g of Polymer No. 10 was placed between two Pyrex glass plates each 5 cm 33 2 cm ×0.1 cm so that the polymer was located at the center of the plates. A 20 μm thicke aluminum film for thickness adjustment was also placed between the plates. They were preheated on a bench press at 170° C. for 30 minutes and then pressed by slowly applying a pressure while keeping the temperature at that point. The product was taken out of the press, kept at 100° C. for 1 hour and then cooled to obtain a film sample. Light passing through this film looked clearly colored and the color changed depending on the angle of incidence. This indicates that this polymer film has a spiral periodic structure perpendicular to the glass surface and that the chiral smectic C liquid crystal phase is fixed. The sam result was obtained also with respect to the other polymers in Table 3 except Polymer Nos. 9 and 18. In the case of Polymer Nos. 9 and 18, no color is seen because of a long spiral pitch and selective transmission of infrared light.

Identification of liquid crystal phase was performed with respect to each of the polymers shown in Table 3 according to the above methods (1), (2), and (3) and the results of Table 4 were obtained. It turned out that all of the polymers had a stable chiral smectic C liquid crystal phase in a wide temperature range and that the chiral smectic C phase could be fixed easily.

TABLE 4

| Polymer No. | Phase transition temperature (°C.)*[1] | Phase series (in temp. drop)*[2] |
|---|---|---|
| 9 | 201, 195, 109, 95 | Iso, Ch, $S_A$, Sc*, K |
| 10 | 179, 172, 104, 88 | Iso, Ch, $S_A$, Sc*, K |
| 11 | 154, 139, 100, 76 | Iso, Ch, $S_A$, Sc*, K |
| 12 | 125, 95, 65 | Iso, Ch, Sc*, g |
| 13 | 112, 99, 77 | Iso, Ch, Sc*, g |
| 14 | 178, 84, 70 | Iso, Ch, Sc*, K |
| 15 | 190, 99, 82 | Iso, $S_A$, Sc*, K |
| 16 | 150, 77, 63 | Iso, Ch, Sc*, g |
| 17 | 146, 140, 83, 60 | Iso, Ch, $S_A$, Sc*, g |
| 18 | 127, 120, 72, 51 | Iso, Ch, $S_A$, Sc*, g |

*[1]DSC (20° C./min)
*[2]Iso: isotropic phase,
Ch: cholesteric phase,
$S_A$: smectic A phase,
Sc*: chiral smectic C phase,
g: glass phase,
K: crystal phase

EXAMPLE 5

Preparation of Chiral Smectic C Liquid Crystalline Polyesters (1) 17.3 mmol of diethyl biphenyl-4,4'-dicarboxylate, 14.3 mmol of (S)-2-chloro-1,4-butanediol (enantiotropic excess (e.e.)=92%), 12.4 mmol of 1,6-hexanediol and one drop of tetrabutoxytitanium were charged into reactor equipped with a stirrer. After purging with nitrogen gas, reaction was conducted at 175° C. in a nitrogen gas stream for 60 minutes. The reaction was then continued at 175° C. for 30 minutes under reduced pressure to prepare a polymer (Polymer No. 19 in Table 5).

(2) A solution of 19.2 mmol of biphenyl-4,4'-dicarboxylic acid dichloride, 9.8 mmol of (S)-2-chloro-1,4-butanediol (e.e.=92%), 9.2 mmol of 1,6-hexanediol and 10 ml of pyridine in 100 ml of o-dichlorobenzene was stirred at 70° C. in a nitrogen gas stream for 2 hours to allow polymerization to take place. The reaction solution was filtered and then poured into methanol to allow the resulting polymer to precipitate, followed by filtration and subsequent drying under reduced pressure to give a polymer (Polymer No. 20 in Table 5).

(3Various polyesters (Polymer Nos. 21-27 in Table 5) different in structure, composition ratio and molecular weight were prepared using diethyl biphenyl-4,4'-dicarboxylate or biphenyl-4,4'-dicarboxylic acid dichloride, (S)-2-chloro-1,4-butanediols of various e.e. values and various α, ω-alkanediols, according to the melt process (the process described in the above (1)) or the acid chloride process (the process described in the above (2)). The compositions and [θ] values of the polymers obtained are set forth in Table 5. As an example, regarding Polymer No. 23, the $^1$H-NMR spectra is shown in FIG. 1.

EXAMPLE 6

Identification of Chiral Smectic C structure (1) Determination of DSC and observation with polarizing microscope:

DSC thermogram of Polymer No. 20 is shown in FIG. 2. As a result of observation with a polarizing microscope, a broken fan-shape texture was observed in the temperature range between $T_1$ an $T_2$ at the time of temperature drop in Polymer N.20 an in the temperature range between $T_4$ and $T_5$ in Polymer No. 22. Particularly, in the case of Polymer No. 22, retardation lines were observed in the broken fan-shaped texture, showing that this polymer had the chiral smectic C liquid crystal phase. (In the case of Polymer No. 20, observation with an optical microscope is not made because of a short spiral pitch of its chiral smectic C phase.) Likewise, identification of liquid crystal phase was performed for the other polymers using DSC and a polarizing microscope to obtain the results of Table 6. It turned out that the polymers each had a stable chiral smectic C liquid crystal phase in a wide temperature range. Polarizing photomicrographs of Polymer Nos. 20 and 22 are shown in FIG. 3, in each of which there is recognized a broken fan-shape texture. Particularly, in Polymer No. 22, retardation lines were observed in the said texture.

TABLE 5

| Polymer No. | Polymer Composition | | | A:B:C (molar ratio) | [η] (dl/g) |
|---|---|---|---|---|---|
| | Unit A | Unit B (e.e.%) | Unit C | | |
| 19 | $-C(=O)-C_6H_4-C_6H_4-C(=O)-$ | $-O-CH_2-\overset{*}{C}H(Cl)-CH_2-CH_2O-$ (92) | $-O-(CH_2)_6O-$ | 49:23:28 | 0.21 |
| 20 | " | " | " | 50:28:22 | 0.30 |
| 21 | " | " | $-O-(CH_2)_7O-$ | 49:18:22 | 0.61 |
| 22 | " | " | $-O-(CH_2)_{12}O-$ | 51:24:25 | 0.32 |
| 23 | " | " | $-O-CH(CH_3)-CH_2-CH_2-CH_2O-$ | 50:25:25 | 0.17 |
| 24 | " | $-O-CH_2-\overset{*}{C}H(Cl)-CH_2-CH_2O-$ (27) | $-O-CH_2-CH(CH_3)-CH_2CH_2O-$ | 50:12:38 | 0.23 |

TABLE 5-continued

| Polymer No. | Unit A | Unit B (e.e.%) | Unit C | A:B:C (molar ratio) | [η] (dl/g) |
|---|---|---|---|---|---|
| 25 | " | $-O-CH_2-\underset{*}{\overset{Cl}{C}H}-CH_2-CH_2O-$ (63) | $-O-\overset{CH_3}{\underset{|}{CH}}-CH_2-CH_2-\overset{CH_3}{\underset{|}{CH}}-O-$ | 49:20:31 | 0.27 |
| 26 | " | $-O-CH_2-\underset{*}{\overset{Cl}{C}H}-CH_2-CH_2O-$ (92) | $-O-(CH_2)_{10}O-$ | 48:17:35 | 0.33 |
| 27 | " | $-O-CH_2-\underset{*}{\overset{Cl}{C}H}-CH_2-CH_2O-$ (27) | $-O-CH_2CH_2\overset{CH_3}{\underset{|}{CH}}CH_2CH_2CH_2O-$ | 50:40:10 | 0.54 |

(Note 1)
Polymer Nos. 9-13 and 18 were prepared by the melt process and Polymer Nos. 14-17 by the acid chloride process.
(Note 2)
The compositions ratio of the units B and C in Polymer No. 17 in indistinguishable from NMR; hence, A: (B + C) = 50:50.

TABLE 6

| Polymer No. | Phase transition temperature (°C.)*[1] | Phase series (in temp. drop)*[2] |
|---|---|---|
| 19 | 162, 121, 70 | Iso, $S_A$, Sc*, g |
| 20 | 189, 157, 90 | Iso, $S_A$, Sc*, g |
| 21 | 223, 192, 147 | Iso, $S_A$, Sc*, K |
| 22 | 140, 132, 95 | Iso, Ch, Sc*, K |
| 23 | 107, 89, 73 | Iso, Ch, Sc*, g |
| 24 | 180, 152, 47 | Iso, Ch, Sc*, g |
| 25 | 204, 190, 156 | Iso, Ch, Sc*, K |
| 26 | 145, 84, 79 | Iso, Ch, Sc*, g |
| 27 | 190, 181, 102, 92 | Iso, Ch, $S_A$, Sc*, K |

*[1])DSC (20° C./min)
*[2])Iso: isotropic phase,
Ch: cholesteric phase,
$S_A$: smectic A phase,
Sc*: chiral smectic C phase,
g: glass phase,
K: crystal phase (2) Polarization reversal by the application of voltage:

Each of the polymers in Table 5 was sealed into a cell including two glass (ITO glass) plates whose surfaces had been treated for electroconduction and a 12.5 μm thick polyimide film as a spacer interposed between them to fix the thickness. The cell was then placed in a Mettler's hot stage and positive and negative voltages were applied under observation with a polarizing microscope while the temperature was held at a level at which the chiral smectic C phase was exhibited, to check the reversal of polarization. When a square wave AC voltage of 300V, 10 Hz was applied, the domain in the microscope field changed form dark to bright field, following the change in voltage. This change was observed with respect to all the polymers. It turned out that the reversal of polarization occurred in all the polymers. That is, all of the polymers shown in Table 5 proved to be chiral smectic C liquid crystals, exhibiting ferroelectricity.

(3) Forming transmission type color film:

0.2 g of Polymer No. 21 was placed between two Pyrex glass plates each 5 cm ×2 cm ×0.1 cm so that the polymer was located at the center of the plates. A 20 μm thick aluminum film for thickness adjustment was also placed between the plates. They were preheated on a bench press at 200° C. for 30 minutes and then pressed by slowly applying a pressure while keeping the temperature at that point. The product was taken out of the press, kept at 180° C. for 1 hour and then cooled to obtain a film sample. Light passing through this film looked clearly colored and the color changed depending on the angle of incidence. This indicates that this polymer film has a spiral periodic structure perpendicular to the glass surface and that the chiral smectic C liquid crystal phase is fixed.

As set forth hereinabove, the novel chiral smectic C liquid crystalline polyester of the present invention exhibits a stable chiral smectic C phase in a wide composition range and a wide temperature range, which phase can be fixed easily. Further, since it can be easily prepared and formed into a film of high strength, it is possible to easily produce a film having a fixed chiral smectic C phase. Therefore, the polyester of the invention is suitable for various uses, including the optical field and the field of optoelectronics.

Brief Description of the Drawings

FIG. 1 shows $^1$H-NMR spectra of chiral smectic C liquid crystalline polyesters prepared according t the present invention, in which the abscissae are shift values (ppm from TMS);

Figure 2A:
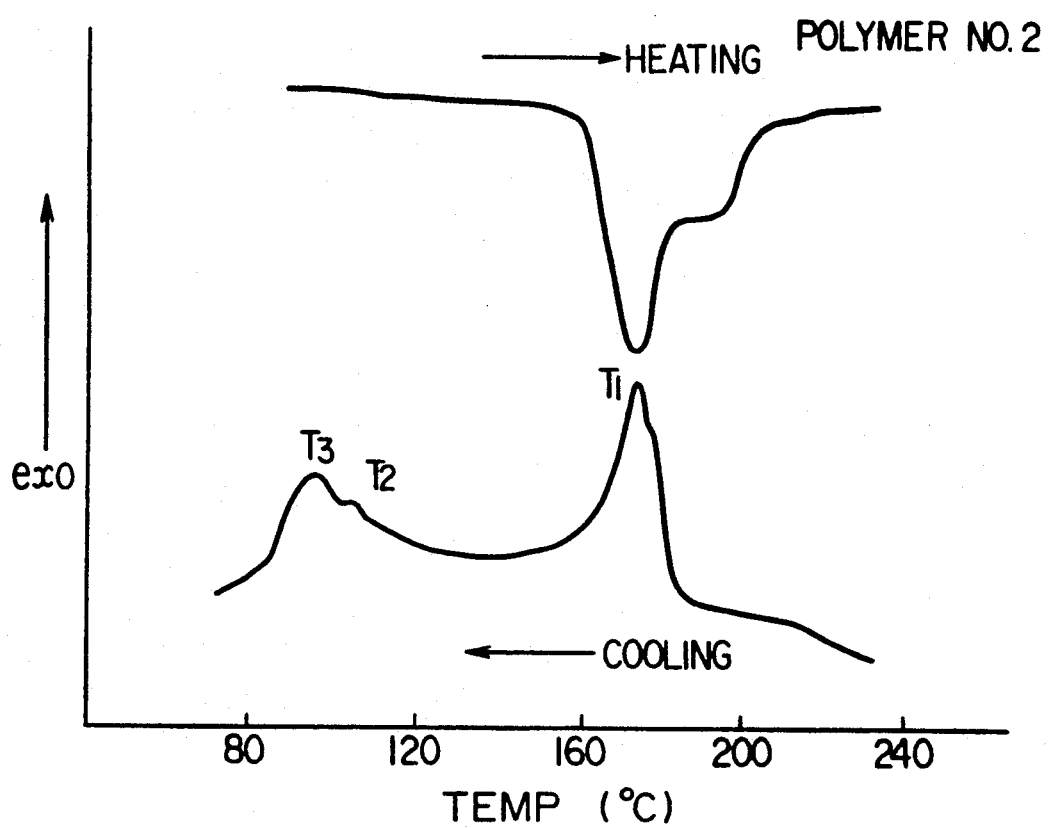
FIG. 2 shows DSC thermograms of the polymers of the present invention.
Figure 2B:
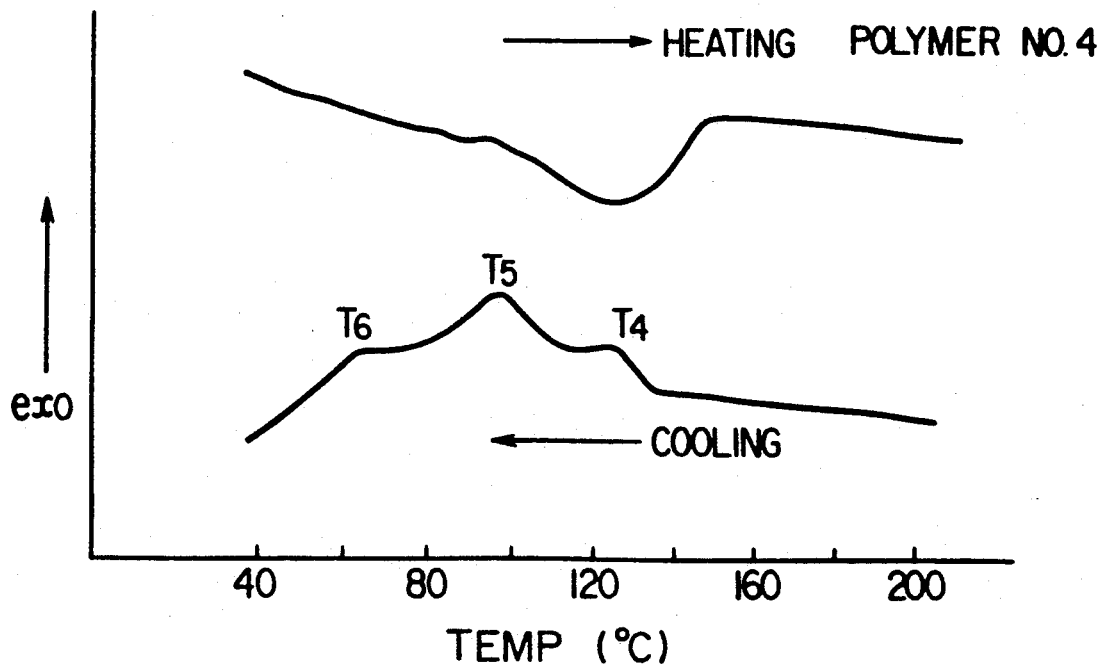
Figure 2D:
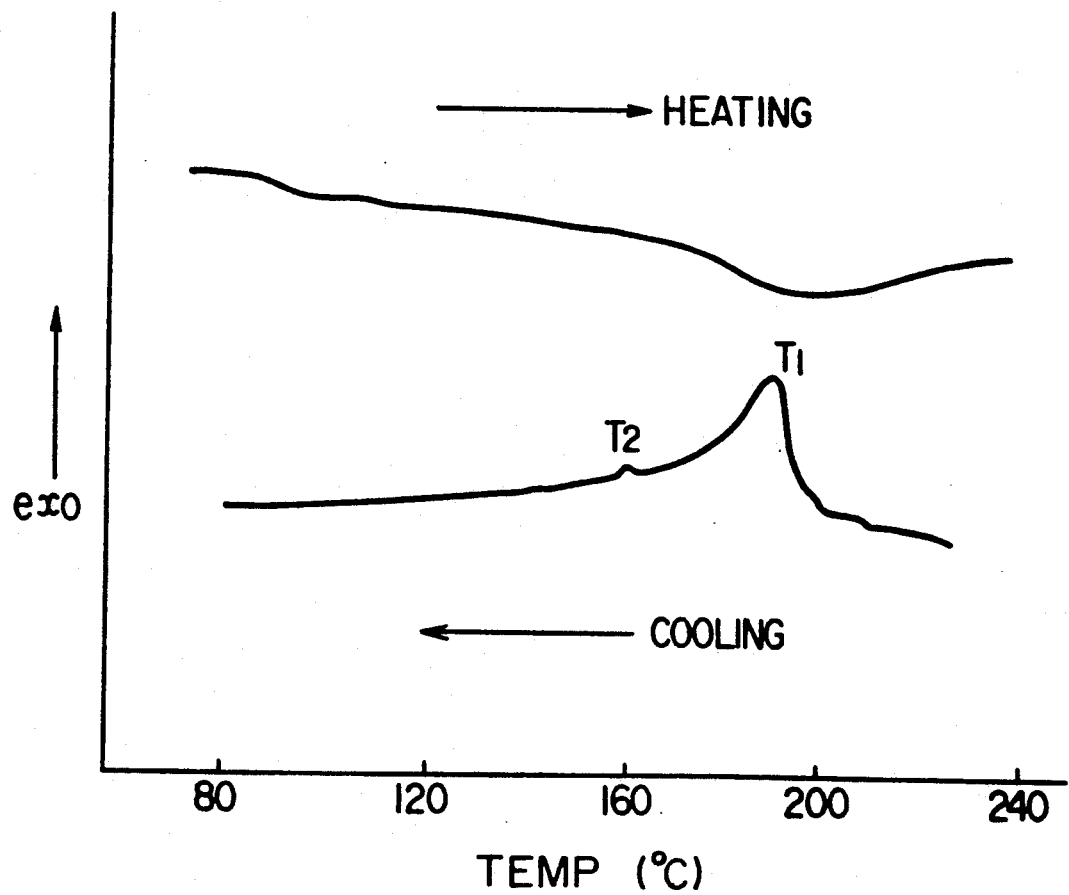

What is claimed is:

1. A chiral smectic C liquid crystalline polyester consisting essentially of structural units (A), (B) and (C) of the following formulae:

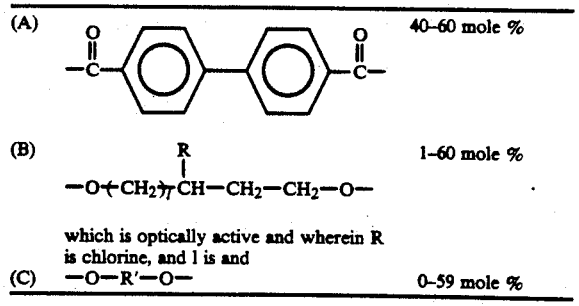

(A) 40-60 mole %

(B) 1-60 mole %

$-O+CH_2)_{l}\overset{R}{\underset{|}{CH}}-CH_2-CH_2-O-$ which is optically active and wherein R is chlorine, and l is and (C) $-O-R'-O-$ 0-59 mole % wherein R' represents a straight chain or branched divalent hydrocarbon group having 2 to 18 carbon atoms.

2. A chiral smectic C liquid crystalline polyester according to claim 1, wherein the contents of the structural units (A), (B) and (C) are 45-55 mole%, 10-50 mole% and 5-50 mole%, respectively.

3. A chiral smectic C liquid crystalline polyester according to claim 2, wherein the contents of the structural unit (A) is about 50 mole% and the total content of the structural units (B) and (C) is about 50 mole%.

4. A chiral smectic C liquid crystalline polyester according to claim 1, wherein R' in the structural unit (C) is a straight chain or branched, saturated, divalent chain hydrocarbon group.

5. A chiral smectic C liquid crystalline polyester according to claim 1, wherein R' in the structural unit (C) is a branched, saturated, divalent chain hydrocarbon group having 3 to 12 carbon atoms.

* * * * *

UNITED STATES PATENT AND TRADEMARK OFFICE
CERTIFICATE OF CORRECTION

PATENT NO.  : 5,230,825
DATED       : July 27, 1993
INVENTOR(S) : Takafumi Ishii, et al.

It is certified that error appears in the above-indentified patent and that said Letters Patent is hereby corrected as shown below:

Column 3, line 35: after "0-59 mole %" insert --wherein R' represents a straight chain or branched, divalent hydrocarbon group-- and delete lines 37-38.

Column 3, line 45: after "property" insert --.--

Column 3, line 59: before "3-ethyl" insert --3-methyl-1,6-hexanediol,--

Column 4, line 6: after "narrower" insert --.--

Column 4, line 12: after "obtained" insert --.--

Column 5, line 28: "[n]" should read --[η]--

Column 6, line 8: "methyl1" should read as --methyl-1,--

Column 6, line 32: ")1)" should read as --(1)--

Column 6, line 35; "a" should read as --as--

Column 6, line 68: "form" should read as --from--

UNITED STATES PATENT AND TRADEMARK OFFICE
CERTIFICATE OF CORRECTION

PATENT NO. : 5,230,825
DATED : July 27, 1993
INVENTOR(S) : Takafumi Ishii, et al.

It is certified that error appears in the above-indentified patent and that said Letters Patent is hereby corrected as shown below:

Column 8, Table 1, line 11: "dl" should read as --d $\ell$ --

Column 10, line 56: after "cm" delete "33"

Column 10, line 58: "thicke" should read as --thick--

Column 12, line 16: "[θ]" should read as --[η]--

Column 12, line 29: "an" should read as --and--

Column 13, line 19: "17 in" should read as --17 is--

Column 14, line 39: "t" should read as --to--

Column 14, line 59, Claim 1" "and 1 is and" should read as --and $\ell$ is 1 and--

Signed and Sealed this

Twenty-ninth Day of March, 1994

Attest:

BRUCE LEHMAN

*Attesting Officer*  *Commissioner of Patents and Trademarks*